US012766674B2

(12) United States Patent
Van Essen et al.

(10) Patent No.: US 12,766,674 B2
(45) Date of Patent: Oct. 20, 2026

(54) WEAR RESISTANT TOOL BIT

(71) Applicant: MILWAUKEE ELECTRIC TOOL CORPORATION, Brookfield, WI (US)

(72) Inventors: James J. Van Essen, Hales Corners, WI (US); Michael J. Zimmermann, New Berlin, WI (US); Smith C. Theiler, Plymouth, WI (US); Zachary J. Geschke, Milwaukee, WI (US); Carl Dietz, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 199 days.

(21) Appl. No.: 18/596,956

(22) Filed: Mar. 6, 2024

(65) Prior Publication Data

US 2024/0208012 A1 Jun. 27, 2024

Related U.S. Application Data

(63) Continuation of application No. 18/124,106, filed on Mar. 21, 2023, now Pat. No. 11,958,168, which is a
(Continued)

(51) Int. Cl.
*B25B 15/00* (2006.01)
*B25B 23/00* (2006.01)
*C22C 33/02* (2006.01)

(52) U.S. Cl.
CPC ........ *B25B 15/002* (2013.01); *B25B 23/0035* (2013.01); *C22C 33/0292* (2013.01); *B25B 15/005* (2013.01)

(58) Field of Classification Search
CPC ... B25B 15/002; B25B 15/004; B25B 15/005; B25B 15/007; B25B 15/008; B25B 23/0035; C21D 2201/05; C22C 33/0292
See application file for complete search history.

(56) References Cited

U.S. PATENT DOCUMENTS 442,710 A 12/1890 Marsh
876,675 A 1/1908 Albrecht
(Continued)

FOREIGN PATENT DOCUMENTS

CN 201070753 Y 6/2008
CN 111386164 B 10/2022
(Continued)

OTHER PUBLICATIONS

Vessel, "Problem Solvers are ready to go!" catalog, 5 pages, printed from web site www.vessel.jp/online/pro_b_bit.html on Sep. 11, 2008.
(Continued)

*Primary Examiner* — David B. Thomas
(74) *Attorney, Agent, or Firm* — Michael Best & Friedrich LLP

(57) ABSTRACT

A tool bit for driving a fastener including a shank having a tool coupling portion configured to be coupled to a tool, a head portion configured to engage the fastener, and an intermediate portion disposed between the tool coupling portion and the head portion. The intermediate portion having an outer diameter that is less than an outer dimension of the tool coupling portion. The head portion is composed of powdered metal (PM) steel having carbide particles distributed uniformly throughout the head portion. The outer diameter of the intermediate portion is selected such that the intermediate portion has a strength about 10% stronger than a shear strength of the head portion.

15 Claims, 5 Drawing Sheets

Related U.S. Application Data continuation of application No. 16/767,307, filed as application No. PCT/US2018/063677 on Dec. 3, 2018, now Pat. No. 11,638,987.

(60) Provisional application No. 62/632,875, filed on Feb. 20, 2018, provisional application No. 62/593,526, filed on Dec. 1, 2017.

(56) References Cited

U.S. PATENT DOCUMENTS 896,443 A 8/1908 Dyett
925,115 A 6/1909 Loewenberg
D59,417 S 10/1921 Graham
1,645,672 A 10/1927 Saun
1,776,525 A 9/1930 Talbot
1,923,132 A 8/1933 Witkin
1,932,113 A 10/1933 Long
1,979,460 A 11/1934 Forsberg
1,984,839 A 12/1934 Murray
2,010,616 A 8/1935 Walsh
2,022,703 A 12/1935 Banner
2,216,382 A 10/1940 West et al.
2,281,631 A 5/1942 Spillmann et al.
2,307,556 A 1/1943 Wileman
2,366,682 A 1/1945 West et al.
2,400,684 A 5/1946 Clark
2,410,971 A 11/1946 Hartley
2,417,225 A 3/1947 West et al.
2,445,978 A 7/1948 Stellin
D150,800 S 8/1948 Magnus, Jr.
2,515,839 A 7/1950 Robertson
2,522,996 A 9/1950 Cone
2,523,041 A 9/1950 McKenzie
2,537,029 A 1/1951 Cambern
2,592,978 A 4/1952 Trimboli
2,621,688 A 12/1952 Wales
2,740,191 A * 4/1956 Kuzmick .................. B22F 3/24 419/26
2,804,894 A 9/1957 Rosenburg
2,820,382 A 1/1958 Smith
2,833,548 A 5/1958 Clark
2,912,890 A * 11/1959 Robinson ................ B25B 27/18 81/53.2
2,964,931 A 12/1960 Sorenson
2,969,660 A 1/1961 Dale et al.
3,129,571 A 4/1964 Reynolds
3,151,512 A 10/1964 Charczenko
3,213,719 A 10/1965 Kloack
3,237,741 A 3/1966 Potter et al.
3,253,626 A 5/1966 Stillwagon, Jr. et al.
3,331,267 A 7/1967 Tietge
3,387,669 A 6/1968 Wise, Jr. et al.
3,392,793 A 7/1968 Pauley
3,393,722 A 7/1968 Windham
3,419,135 A 12/1968 Millner
D218,609 S 9/1970 Charles
3,592,087 A 7/1971 Pauley
3,703,916 A 11/1972 Sundsten et al.
3,753,625 A 8/1973 Fabrizo et al.
3,888,144 A 6/1975 Parsons
3,891,017 A 6/1975 Iskra
3,916,736 A 11/1975 Clemens
3,936,299 A 2/1976 Steven
3,969,810 A 7/1976 Pagano
3,985,170 A 10/1976 Iskra
4,036,670 A * 7/1977 De Walt ................... C21D 1/68 148/531
4,037,515 A 7/1977 Kesselman
4,092,753 A 6/1978 Fuhrmann
4,096,896 A 6/1978 Engel
4,105,056 A 8/1978 Arnn
4,121,927 A * 10/1978 Lohman .............. C22C 33/0257 419/33
4,142,923 A * 3/1979 Satava ..................... C21D 1/18 148/575
4,197,118 A 4/1980 Weich, Jr.
4,215,600 A 8/1980 Kesselman
4,246,811 A 1/1981 Bondhus et al.
4,249,945 A 2/1981 Haswell
4,399,723 A 8/1983 Marleau
4,409,867 A 10/1983 Lyden
4,573,839 A 3/1986 Finnegan
4,680,996 A 7/1987 Gold
4,692,073 A 9/1987 Martindell
4,705,124 A 11/1987 Abrahamson et al.
4,710,223 A 12/1987 Matejczyk
4,737,332 A 4/1988 Miyashita et al.
4,765,950 A 8/1988 Johnson
4,782,574 A 11/1988 Karcher et al.
4,795,598 A 1/1989 Billiet
4,800,786 A 1/1989 Arnold et al.
4,825,732 A 5/1989 Arnold et al.
4,833,951 A 5/1989 Karcher et al.
4,836,059 A 6/1989 Arnold
4,838,361 A 6/1989 O'Toole
4,852,196 A 8/1989 Martin
4,880,461 A * 11/1989 Uchida .................... C21D 1/25 420/10
4,884,478 A 12/1989 Lieser
4,936,170 A 6/1990 Zumeta
4,943,403 A 7/1990 Miyashita et al.
4,947,713 A 8/1990 Arnold
4,964,907 A 10/1990 Kiyota et al.
4,982,627 A 1/1991 Johnson
5,009,841 A 4/1991 Bloemacher et al.
5,012,708 A 5/1991 Martindell
5,012,709 A 5/1991 Sundsten et al.
5,028,367 A 7/1991 Wei et al.
5,031,488 A 7/1991 Zumeta
5,059,387 A 10/1991 Brasel
5,070,750 A 12/1991 Jones et al.
5,079,978 A 1/1992 Kupfer
5,122,326 A 6/1992 Jackson et al.
5,140,877 A 8/1992 Sloan
5,152,642 A 10/1992 Pitts et al.
5,176,050 A 1/1993 Sauer et al.
5,180,042 A 1/1993 Ogiso
5,182,973 A 2/1993 Martindell
5,199,336 A 4/1993 Wuilmart
5,228,250 A 7/1993 Kesselman
5,262,122 A 11/1993 Weich, Jr.
5,295,423 A 3/1994 Mikic
5,295,831 A 3/1994 Patterson et al.
5,299,474 A 4/1994 Hohmann et al.
5,328,361 A * 7/1994 Ezcurra .................... A61C 7/04 433/4
5,330,230 A 7/1994 Craig
5,332,537 A 7/1994 Hens et al.
RE34,680 E 8/1994 Lieser
5,338,508 A 8/1994 Nitta et al.
D350,685 S 9/1994 Perkins et al.
5,353,667 A 10/1994 Wilner
5,370,021 A 12/1994 Shigematsu
5,380,476 A 1/1995 Matsushita et al.
5,397,531 A 3/1995 Peiris et al.
D359,335 S 6/1995 Cartwright
5,505,798 A * 4/1996 Nelson .................... C22C 38/42 148/579
5,535,867 A 7/1996 Coccaro et al.
5,613,183 A 3/1997 Weich, Jr.
5,619,882 A 4/1997 Godtner
5,627,258 A 5/1997 Takayama et al.
5,641,920 A 6/1997 Hens et al.
5,676,421 A 10/1997 Brodsky
5,704,261 A 1/1998 Strauch et al.
5,791,212 A 8/1998 Han
5,819,606 A 10/1998 Arnold
5,830,287 A 11/1998 Pinnow et al.
5,868,047 A 2/1999 Faust et al.
5,885,149 A 3/1999 Gillet et al.
D410,372 S 6/1999 Strauch
5,950,063 A 9/1999 Hens et al.

(56) References Cited

U.S. PATENT DOCUMENTS 5,953,969 A 9/1999 Rosenhan
5,957,012 A 9/1999 McCune
5,984,596 A 11/1999 Fehrle et al.
6,019,022 A 2/2000 Dotson
6,032,556 A 3/2000 Hu
6,047,618 A 4/2000 Pieri
6,051,184 A 4/2000 Kankawa
6,082,227 A 7/2000 Vogel
6,089,133 A 7/2000 Liao
6,093,761 A 7/2000 Schofalvi
RE36,797 E 8/2000 Eggert et al.
6,098,499 A 8/2000 Pool
D431,768 S 10/2000 Feik
6,138,539 A 10/2000 Carchidi et al.
6,193,242 B1 2/2001 Robison
6,204,316 B1 3/2001 Schofalvi
6,234,660 B1 5/2001 Hullmann et al.
D445,325 S 7/2001 Fruhm
6,257,098 B1 7/2001 Cirone
6,302,001 B1 10/2001 Karle
6,308,598 B1 10/2001 O'Neil
6,332,384 B1 12/2001 Cluthe
6,345,560 B1 2/2002 Strauch et al.
6,352,011 B1 3/2002 Fruhm
D455,627 S 4/2002 Song
D455,943 S 4/2002 Lin
6,376,585 B1 4/2002 Schofalvi et al.
6,393,950 B1 5/2002 Crosser
6,435,065 B2 8/2002 Kozak et al.
D462,596 S 9/2002 Fruhm
6,490,950 B2 12/2002 Ray et al.
6,520,055 B1 2/2003 Reusch et al.
6,537,487 B1 3/2003 Kuhns
6,547,210 B1 4/2003 Marx et al.
6,547,562 B2 4/2003 Kumar
6,666,258 B1 12/2003 Kono
6,701,814 B2 3/2004 Porkapile
6,702,981 B2 * 3/2004 Hetzner .................. C22C 38/22 420/113
6,733,896 B2 5/2004 Dolan et al.
6,761,093 B2 7/2004 Chang
6,792,831 B2 9/2004 Crosser
6,883,405 B2 4/2005 Strauch
6,988,859 B2 1/2006 Borschert et al.
7,010,998 B2 3/2006 Ying-Hao
7,028,588 B2 4/2006 Shih
7,107,882 B1 9/2006 Chang
7,117,765 B1 10/2006 Wallden
7,143,670 B2 12/2006 Geary
7,159,493 B1 1/2007 Huang
7,168,348 B2 1/2007 Holland-Letz
7,188,556 B1 3/2007 Rinner
7,261,023 B2 8/2007 Taguchi
7,331,263 B2 2/2008 Erickson et al.
7,437,979 B1 10/2008 Wang
D596,003 S 7/2009 Collier
D600,525 S 9/2009 Meng
7,581,470 B1 9/2009 Huang
7,662,338 B2 2/2010 Tanaka
7,700,037 B2 * 4/2010 Westin .................... C22C 38/04 420/128
7,814,815 B2 10/2010 Chen
D631,723 S 2/2011 DeBaker
7,882,908 B2 2/2011 Koch et al.
7,959,706 B2 6/2011 Tanaka
D646,138 S 10/2011 Hsu
D646,139 S 10/2011 Hsu
D646,547 S 10/2011 DeBaker
8,028,608 B2 10/2011 Sixto, Jr. et al.
8,047,260 B2 11/2011 Uno et al.
8,052,156 B2 11/2011 Chen
8,418,587 B2 4/2013 DeBaker
8,468,913 B1 6/2013 Bond
8,752,455 B1 6/2014 Taylor, Jr.
8,955,418 B2 2/2015 Peters et al.
8,973,474 B2 3/2015 Lai
D725,984 S 4/2015 Moss et al.
D726,521 S 4/2015 Moss et al.
D752,408 S 3/2016 Moss et al.
9,481,023 B2 * 11/2016 Shepard ................. C21D 1/185
9,737,977 B2 8/2017 Taguchi et al.
9,849,570 B2 12/2017 DeBaker
10,022,845 B2 7/2018 Neitzell
10,065,294 B2 9/2018 DeBaker
10,233,519 B2 * 3/2019 Wu ......................... C22C 38/26
10,543,535 B2 * 1/2020 Beaulieu ................ B22F 9/082
D921,468 S 6/2021 Zimmermann et al.
11,077,493 B2 * 8/2021 Olejnik .................. C22C 1/058
11,638,987 B2 5/2023 Van Essen et al.
2001/0001892 A1 5/2001 Hu
2002/0046629 A1 4/2002 Borschert et al.
2002/0060206 A1 5/2002 Katayama et al.
2002/0129680 A1 9/2002 Holland-Letz
2002/0164260 A1 * 11/2002 Koga .................... C22C 38/001 148/326
2004/0007095 A1 1/2004 Meng
2004/0099106 A1 5/2004 Strauch et al.
2005/0028651 A1 2/2005 Crosser
2005/0076749 A1 4/2005 Liu
2005/0087045 A1 4/2005 Gryciuk et al.
2005/0141986 A1 6/2005 Flesher
2005/0227772 A1 10/2005 Kletecka et al.
2006/0027054 A1 2/2006 Wang
2006/0037431 A1 2/2006 Bernhard et al.
2006/0130621 A1 6/2006 Novak et al.
2006/0230887 A1 10/2006 Taguchi
2006/0266163 A1 11/2006 Crosser
2006/0286506 A1 12/2006 Birnholtz
2007/0028728 A1 2/2007 Griffiths
2007/0062382 A1 3/2007 Hu
2007/0131065 A1 6/2007 Shih
2007/0207715 A1 9/2007 Webb
2007/0227314 A1 10/2007 Erickson et al.
2008/0034928 A1 2/2008 Sheu
2008/0047401 A1 2/2008 Lu
2008/0087142 A1 4/2008 Lin
2008/0145264 A1 * 6/2008 Hetzner ................... C21D 5/00 148/612
2008/0216616 A1 9/2008 Hsieh
2008/0295650 A1 12/2008 Hsieh
2010/0139099 A1 6/2010 Blaauw
2010/0154587 A1 6/2010 Eason
2010/0192736 A1 8/2010 Burch et al.
2010/0269264 A1 10/2010 Huang
2010/0275741 A1 11/2010 Lai
2010/0288086 A1 11/2010 Huang
2010/0307298 A1 12/2010 Lai
2011/0189046 A1 8/2011 Bruhn et al.
2011/0197721 A1 8/2011 DeBaker
2011/0266068 A1 11/2011 Eason et al.
2011/0283842 A1 11/2011 Lai
2011/0315456 A1 12/2011 Lyons
2012/0003056 A1 1/2012 Jaeger
2013/0129435 A1 5/2013 Ortlund et al.
2013/0145903 A1 6/2013 DeBaker
2014/0318328 A1 10/2014 DeBaker
2015/0068647 A1 * 3/2015 Johansson ............... C22C 38/26 148/328
2015/0196995 A1 7/2015 Neitzell
2017/0151609 A1 * 6/2017 Elsen ...................... B22F 3/006
2018/0311799 A1 11/2018 Hsu
2018/0326563 A1 11/2018 DeBaker
2020/0055166 A1 2/2020 Van Essen et al.
2020/0406433 A1 12/2020 Van Essen et al.

FOREIGN PATENT DOCUMENTS

DE 2231949 A1 2/1973
DE 3907567 A1 9/1989
DE 3821169 A1 * 12/1989 ............... C21D 9/30
DE 4207964 A1 9/1993
DE 19614961 A1 2/1997
DE 19622846 A1 12/1997
DE 19628901 C1 1/1998

(56) References Cited

FOREIGN PATENT DOCUMENTS

| | | | | |
|---|---|---|---|---|
| DE | 10123407 | A1 | | 1/2002 |
| DE | 10144990 | A1 | | 2/2003 |
| EP | 0046209 | B1 | | 9/1986 |
| EP | 0221279 | A2 | | 5/1987 |
| EP | 0279899 | A1 | | 8/1988 |
| EP | 0467232 | A2 | | 1/1992 |
| EP | 0610693 | A1 | | 8/1994 |
| GB | 963097 | A | | 7/1964 |
| GB | 1476441 | A | | 6/1977 |
| JP | H07316640 | A | * | 12/1995 |
| JP | 2000006037 | A | | 1/2000 |
| JP | 2000167775 | A | | 6/2000 |
| JP | 2000167776 | A | | 6/2000 |
| JP | 2000198081 | A | | 7/2000 |
| JP | 3285823 | B2 | | 5/2002 |
| JP | 2003183761 | A | | 7/2003 |
| JP | 2004142005 | A | | 5/2004 |
| JP | 2004202665 | A | | 7/2004 |
| JP | 2004237420 | A | | 8/2004 |
| JP | 2005254406 | A | | 9/2005 |
| JP | 2005254407 | A | | 9/2005 |
| JP | 2006051563 | A | | 2/2006 |
| JP | 2007111790 | A | | 5/2007 |
| JP | 2008093799 | A | | 4/2008 |
| JP | 2014223711 | A | * | 12/2014 |
| SU | 1006514 | A1 | * | 3/1983 |
| SU | 1022996 | A1 | * | 6/1983 |
| WO | 8908536 | A1 | | 9/1989 |
| WO | 9004498 | A1 | | 5/1990 |
| WO | 9414576 | A1 | | 7/1994 |
| WO | 9415755 | A1 | | 7/1994 |
| WO | 9630167 | A1 | | 10/1996 |
| WO | 9912145 | A1 | | 3/1999 |
| WO | 2006094940 | A1 | | 9/2006 |
| WO | 2006100283 | A1 | | 9/2006 |
| WO | 2009029993 | A1 | | 3/2009 |

OTHER PUBLICATIONS

Robert Bosch Power Tool Corporation, catalog, 1982, 3 pages.

Black & Decker, Catalog 1(K), Sep. 26, 1960, 4 pages.

Black & Decker, catalog, 1947, 4 pages.

PCT/US2009/063515 International Search Report and Written Opinion dated Dec. 23, 2009 (10 pages).

Wera Tools, Bit Checks Bit and holder sets in a extremely compact format, <http://www-US.wera.de/product_detail_us.html?L=1&file=root_category_tools_for_power_use_bit_sets_bit-checks_8700-9_ph_btz&lang=en-US> webpage accessed Jan. 12, 2015, 2 pages.

International Search Report and Written Opinion for Application No. PCT/US2018/063677 dated Mar. 22, 2019 (13 pages).

* cited by examiner

WEAR RESISTANT TOOL BIT

CROSS-REFERENCE TO RELATED APPLICATIONS

This application is a continuation of U.S. patent application Ser. No. 18/124,106, filed on Mar. 21, 2023, now U.S. Pat. No. 11,958,168, which is a continuation of U.S. patent application Ser. No. 16/767,307, filed on May 27, 2020, now U.S. Pat. No. 11,638,987, which is a national stage entry of International Application No. PCT/US2018/063677 filed Dec. 3, 2018, which claims priority to U.S. Provisional Patent Application No. 62/593,526, filed on Dec. 1, 2017, and to U.S. Provisional Patent Application No. 62/632,875, filed on Feb. 20, 2018, the entire contents of each of which are incorporated by reference herein.

BACKGROUND OF THE INVENTION

The present invention pertains to wear resistant tool bits and methods of making the same. More particularly, the present invention pertains to wear resistant tool bits made from tool steel manufactured by a powdered metal process.

Tool bits, such as driver bits, are typically made of steel materials that contain iron carbide ($Fe_3C$), but not other alloy carbides ($M_xC$).

SUMMARY OF THE INVENTION

In one embodiment, the invention provides a tool bit for driving a fastener. The tool bit includes a shank having a tool coupling portion configured to be coupled to a tool. The tool coupling portion has a hexagonal cross-sectional shape. The shank also has a head portion configured to engage the fastener. The head portion is composed of powdered metal (PM) steel having carbide particles distributed uniformly throughout the head portion.

In another embodiment, the invention provides a method of manufacturing a tool bit for driving a fastener. The method includes the steps of providing powdered metal (PM) steel, atomizing the PM steel into micro ingots, injecting the atomized PM steel micro ingots into a mold, and sintering the atomized PM steel micro ingots, while in the mold, into the tool bit such that carbide particles are uniformly distributed throughout the tool bit. The tool bit includes a tool coupling portion having a hexagonal cross-sectional shape configured to be coupled to a tool and a head portion configured to engage the fastener.

In yet another embodiment, the invention provides a method of manufacturing a tool bit for driving a fastener. The method includes the steps of providing a round stock of powdered metal (PM) steel having carbide particles uniformly distributed throughout the round stock, providing a hex stock of non-PM steel, joining the round stock of PM steel to the hex stock of non-PM steel, milling the hex stock of non-PM steel into a tool coupling portion of the tool bit having a hexagonal cross-sectional shape configured to be coupled to a tool, and milling the round stock of PM steel into a head portion of the tool bit configured to engage the fastener In yet still another embodiment, the invention provides a method of manufacturing a tool bit for driving a fastener. The method includes the steps of providing powdered metal (PM) steel, sintering the PM steel to form a hex-shaped block having carbide particles uniformly distributed throughout the hex-shaped block, and milling the hex-shaped block into the tool bit. The tool bit includes a tool coupling portion having a hexagonal cross-sectional shape configured to be coupled to a tool and a head portion configured to engage the fastener Other aspects of the invention will become apparent by consideration of the detailed description and accompanying drawings.

Figure 1:
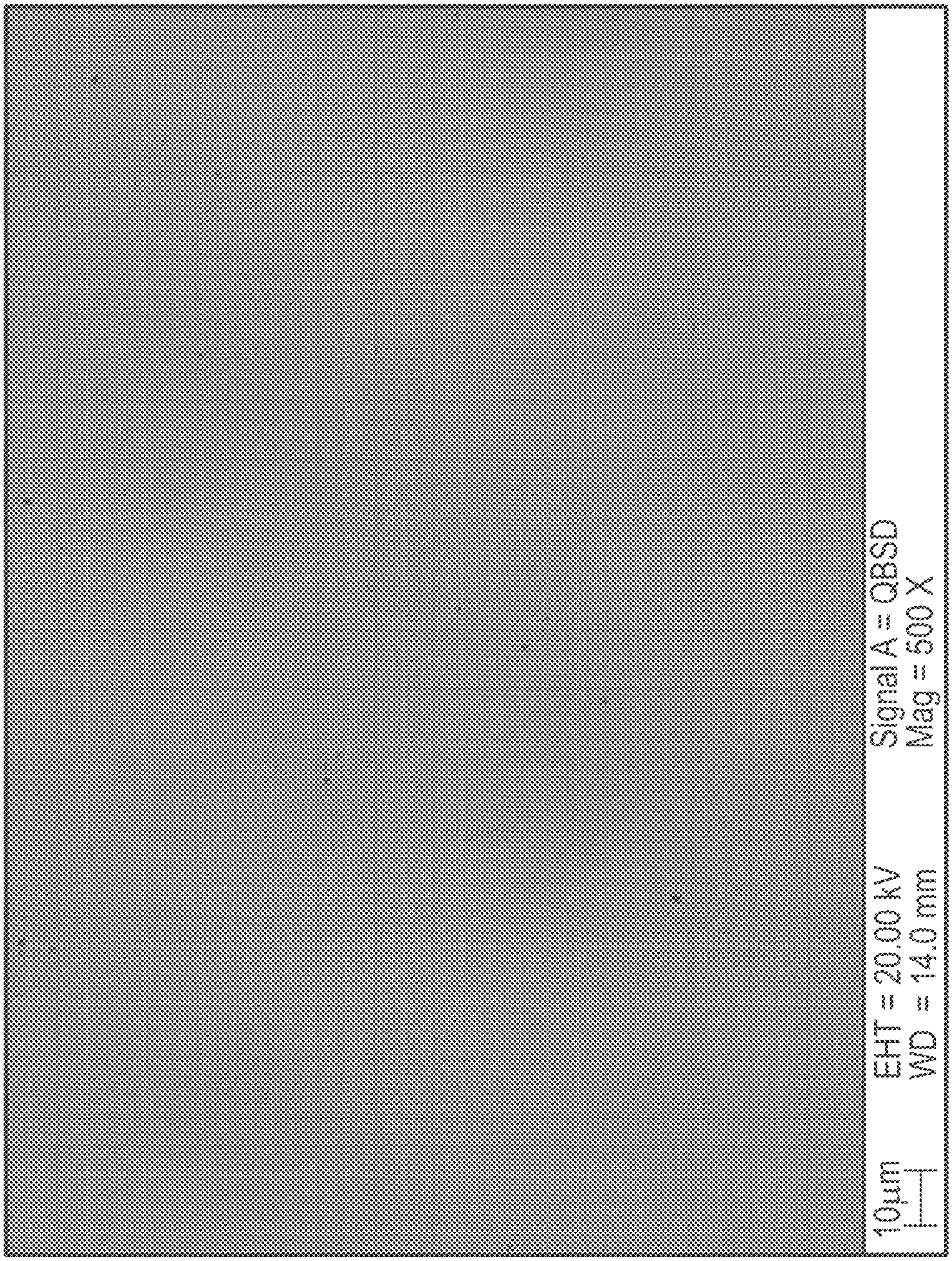
FIG. 1 is a scanning electronic microscope (SEM) image of a conventional driver bit material without carbide particles.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure is generally directed toward tool bits made from powdered metal (PM) having a significantly higher wear resistance than conventional tool bits. The present disclosure is also directed toward methods of making tool bits having high wear resistance.

Bit Material

Powdered metal (PM) is a material made from metal powder, as compared to more typical wrought materials, for example. Without wanting to be limited by theory, tool bits prepared from PM material may have a final microstructure characterized by a significantly more uniform, homogeneous distribution of carbide particles, which results in bits having high wear resistance, toughness, and/or hardness.

Suitable PM materials include metal alloys, such as high speed steel (HSS), preferably “M” grade high speed steel, most preferably M4 steel (herein PM-M4). Although a PM material is preferred, bits made from wrought materials are also contemplated herein. Alternately, the bits may comprise a combination of PM material and non-PM material (e.g., more common steel, such as tool steel). For example, in some embodiments, the tip of a bit may be made of PM material, while the remainder of the bit is made of non-PM material. In such embodiments, the bit is considered a bi-material bit, where the PM tip of the bit is welded to the remainder of the bit made of a more conventional material.

Figure 2:
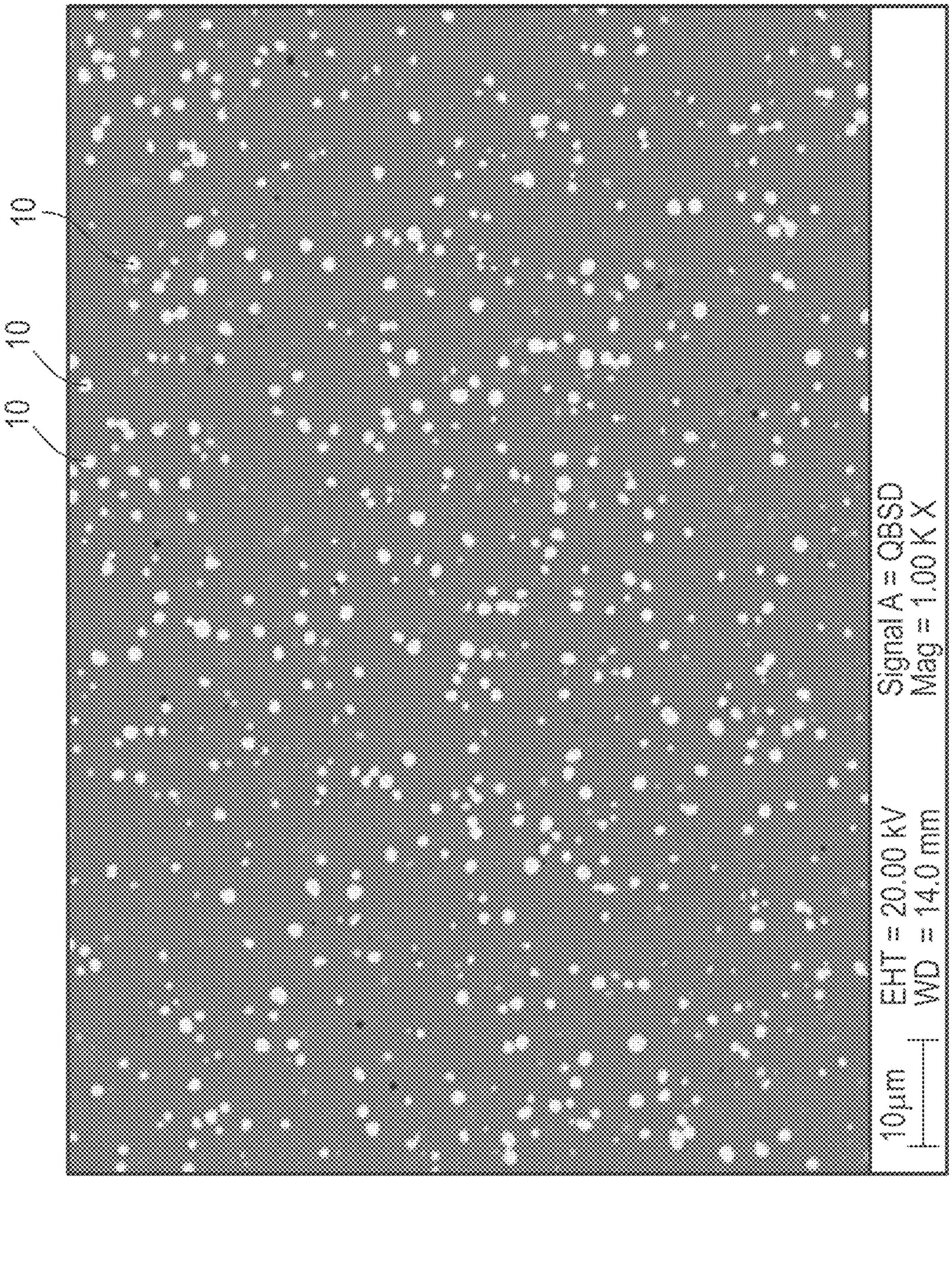
FIG. 2 is an SEM image of a high speed steel (HSS) powdered metal (PM) material, including about 10% to about 15% carbides by area.

FIG. 1 illustrates a conventional steel material without carbide particles used for making tool bits. FIG. 2 illustrates a HSS PM material according to the present disclosure. Carbide particles 10 in FIG. 2 are seen by the small white regions embedded in an iron-based matrix, shown by the gray background of the SEM image. The illustrated carbide particles 10 are homogenous. In other words, the carbide particles 10 are generally uniform in shape, size, and distribution. A size of the carbide particles may be defined as an area of the respective carbide particle. For example, the illustrated carbide particles have a generally round shape such that the area of the respective carbide particle is based on determining an area of a circle. Furthermore, uniform distribution of the carbide particles is defined as each of the particles have about the same shape, size, and distribution throughout the material.

Carbide particles are present in the material in at least 6% by volume. In certain embodiments, carbide particles are present in the material in the range of about 10% to about 15% by volume. In certain other embodiments, the carbide particles are present in the range of about 5% to about 20%, about 6% to about 19%, about 7% to about 18%, about 8% to about 17%, about 9% to about 16%, about 10% to about 16%, about 10% to about 17%, about 10% to about 18%, about 10% to about 19%, about 10% to about 20%, about 9% to about 15%, about 8% to about 15%, about 7% to about 15%, about 6% to about 15%, or about 5% to about 15% by volume.

Alternately or additionally, carbide particles may be present in an amount greater than or equal to about 1%, about 2%, about 3%, about 4%, about 5%, about 6%, about 7%, about 8%, about 9%, about 10%, about 11%, about 12%, about 13%, about 14%, or about 15% by volume. Carbide particles may be present in an amount less than or equal to about 25%, about 24%, about 23%, about 22%, about 21%, about 20%, about 19%, about 18%, about 17%, about 16%, about 15%, about 14%, about 13%, about 12%, about 11%, or about 10% by volume. Carbide particles may be present in an amount of about 1%, about 2%, about 3%, about 4%, about 5%, about 6%, about 7%, about 8%, about 9%, about 10%, about 10.5%, about 11%, about 11.5%, about 12%, about 12.5%, about 13%, about 13.5%, about 14%, about 14.5%, about 15%, about 16%, about 17%, about 18%, about 19%, about 20%, about 21%, about 22%, about 23%, about 24%, or about 25% by volume.

Figure 3:
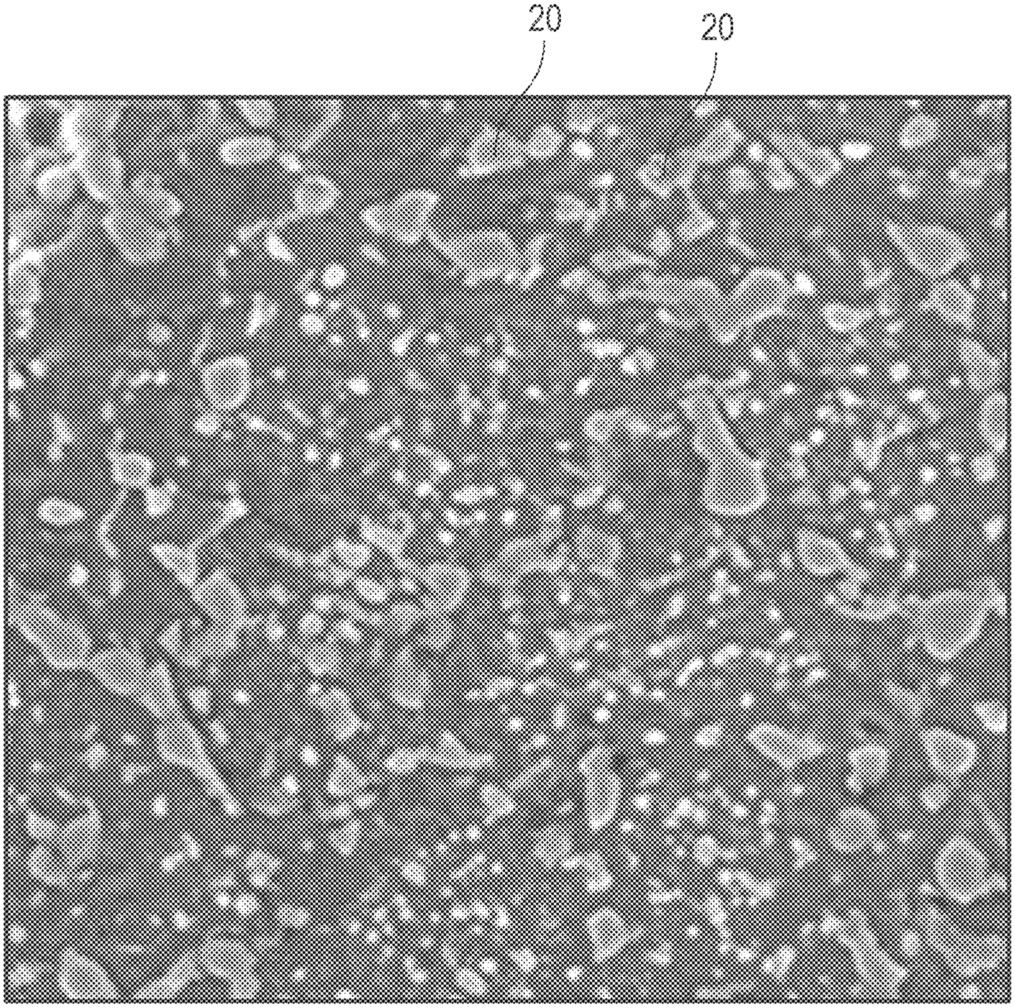
FIG. 3 is an SEM image of a wrought tool steel, including larger, less uniform carbide particles than the HSS PM material shown in FIG. 2.

FIG. 3 illustrates a wrought tool steel including carbide particles 20. The carbide particles 20 (white to light gray regions) have non-uniform size, shape, and distribution. In particular reference to the carbide particles of the HSS PM material embodying the invention shown in FIG. 2, these carbide particles have a relatively more uniform distribution in comparison to the carbide particles of the wrought tool steel of FIG. 3.

Bit Geometry

The HSS PM material shown in FIG. 2 may be used to make tool bits in accordance with the present disclosure. In some embodiments, the wrought tool steel shown in FIG. 3 may also be used to make tool bits in accordance with the present disclosure. The disclosed tool bits may have any suitable form known in the art. As described in more detail below, however, certain types of bits are particularly advantageous: for example, bits having tips that are prone to wearing out, such as PH2 or SQ2 tips.

Figure 4:
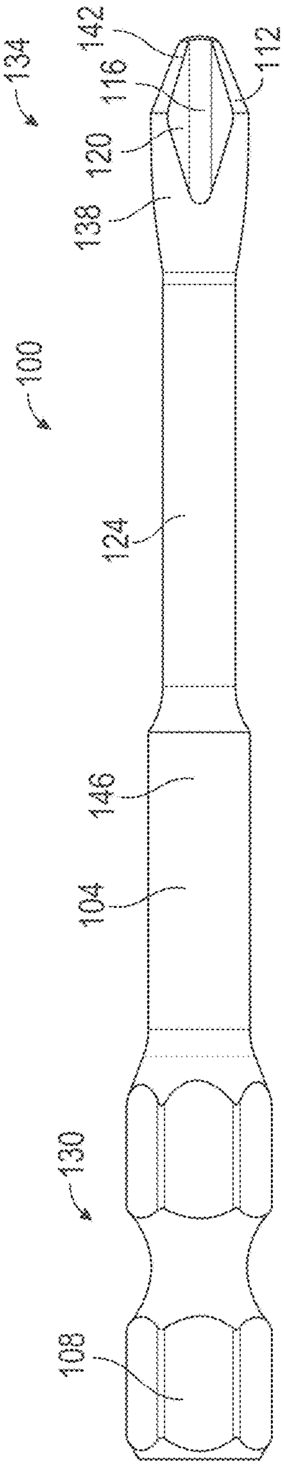
FIG. 4 is a side view of a tool bit composed of a PM material.

FIG. 4 illustrates a Phillips head #2 (PH2) tool bit 100. The tool bit 100 includes a shank 104 having a first end 108 configured to be connected to a tool (e.g., a drill, an impact driver, a screw driver handle, etc.), and a second or working end 112 configured to engage a workpiece or fastener (e.g., a screw, etc.). The shank 104 includes a tool coupling portion 130 having the first end 108, and a head portion 134 having the working end 112.

The tool coupling portion 130 has a hexagonal cross-sectional shape. The tool coupling portion 130 has an outer dimension. The illustrated outer dimension is defined as a width extending between two opposite flat sides of the hexagonal cross-sectional shape.

Figure 7:
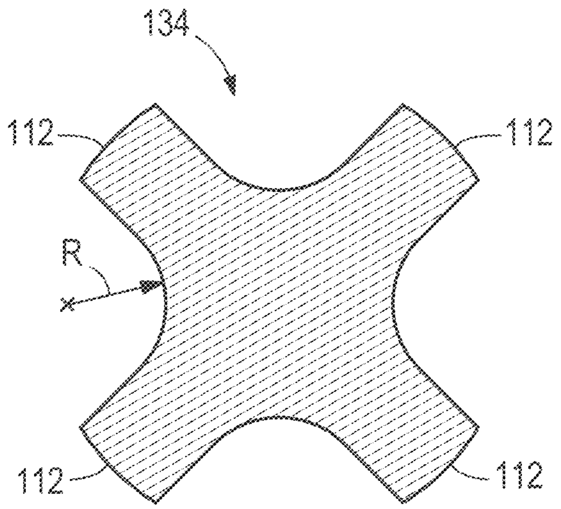
FIG. 7 is a top view of the tool bit of FIG. 4.

As shown in FIG. 4, the head portion 134 includes a plurality of flutes 116, or recesses, circumferentially spaced around the head portion 134. The flutes 116 extend longitudinally along the head portion 134 and converge into vanes 138. The vanes 138 are formed with flat, tapered side walls 120 and outer walls 142, such that the outer walls 142 are inclined and form the front ends of the vanes 138. The vanes 138 are also equidistantly disposed around the head portion 134. As shown in FIG. 7, the illustrated flutes 116 are defined by a single, curved surface having a radius of curvature R. Without wanting to be limited by theory, having the radius R in the flutes 116 allows for better impact strength and/or makes it feasible to use a high hardness material, such as M4 steel for example, without shattering the tip of the bit 100 during routine drill operation. In certain embodiments, the flute radius R is preferably between about 0.8 mm and about 1.0 mm to optimize fitment and strength. Alternately, the flute radius R may be smaller than 0.8 mm.

In certain other embodiments, the flute radius R is between about 0.5 and about 1.2, about 0.6 and about 1.1, about 0.7 and about 1.0, about 0.8 and about 0.9, about 0.7 and about 1.0, about 0.6 and about 1.0, about 0.5 and about 1.0, about 0.8 and about 1.1, or about 0.8 and about 1.2 mm. The flute radius R may be less than or equal to about 1.5, about 1.4, about 1.3, about 1.2, about 1.1, about 1.0, about 0.9, or about 0.8 mm. The flute radius R may be greater than or equal to about 0.1, about 0.2, about 0.3, about 0.4, about 0.5, about 0.6, about 0.7, about 0.8, about 0.9, or about 1.0 mm. The flute radius R may be about 0.1, about 0.2, about 0.3, about 0.4, about 0.5, about 0.55, about 0.6, about 0.65, about 0.7, about 0.75, about 0.8, about 0.82, about 0.84, about 0.85, about 0.86, about 0.88, about 0.9, about 0.92, about 0.94, about 0.95, about 0.96, about 0.98, about 1.0, about 1.05, about 1.1, about 1.15, about 1.2, about 1.3, about 1.4, or about 1.5 mm.

The shank 104 further includes a first intermediate portion 124 extending between the first and second ends 108, 112. The first intermediate portion 124 extends between the tool coupling portion 130 and the head portion 134. The illustrated first intermediate portion 124 has a cylindrical shape. In certain embodiments, the shank 104 may include multiple intermediate portions. For example, the illustrated tool bit 100 further includes a second intermediate portion 146 extending between the first intermediate portion 124 and the tool coupling portion 130. Each of the plurality of intermediate portions 124, 146 has a diameter. In particular, the diameter of each of the plurality of intermediate portions 124, 146 is less than the outer dimension of the tool coupling portion 130. Furthermore, the diameter of each of the plurality of intermediate portions 124, 146 may be the same or different. Additionally or alternately, the tool bit 100 may include a specialized bit holder with a reduced diameter intermediate portion designed specifically for the bit 100.

The diameter of the thinnest intermediate portion 124 of the plurality of intermediate portions 124, 146 is preferably chosen such that the thinnest intermediate portion 124 has a strength about 10% stronger than the shear strength of the head portion 134 of the tool bit 100. For example, the first intermediate portion 124 may be about 3.6 mm in diameter. Each of the plurality of intermediate portions 124,146 has a length. The length of the first intermediate portion 124 (or effective length when there are multiple intermediate portions) is preferably between about 13 mm and about 23 mm, and more preferably about 18 mm.

In certain embodiments, the diameter of the first intermediate portion 124 is between about 2.0 and about 5.0, about 2.5 and about 5.0, about 3.0 and about 5.0, about 3.1 and about 5.0, about 3.2 and about 5.0, about 3.3 and about 5.0, about 3.4 and about 5.0, about 3.5 and about 5.0, about 2.0 and about 4.5, about 2.0 and about 4.0, about 3.0 and about 4.0, about 3.1 and about 4.0, about 3.2 and about 4.0, about 3.3 and about 4.0, about 3.5 and about 4.0 mm. The diameter may be at most about 5.0, about 4.5, about 4.0, about 3.9, about 3.8, about 3.7, and about 3.6 mm.

In certain embodiments, the effective length of the first intermediate portion 124 is between about 10 and about 26, about 11 and about 25, about 12 and about 24, about 13 and about 23, about 14 and about 22, about 15 and about 21, about 16 and about 20, about 17 and about 19, about 13 and about 18, about 13 and about 19, about 13 and about 20, about 13 and about 21, about 13 and about 22, about 18 and about 23, about 17 and about 23, about 16 and about 23, about 15 and about 23, or about 14 and about 23 mm.

Figure 5:
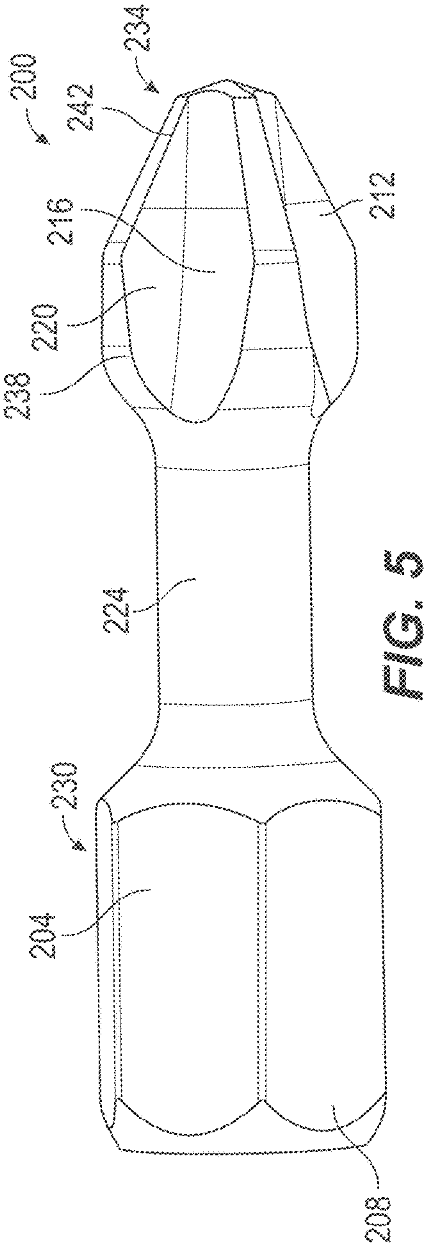
FIG. 5 is a side view of another tool bit composed of a PM material.

FIG. 5 illustrates another PH2 tool bit 200. Similar to the tool bit 100 shown in FIG. 4, the tool bit 200 includes a shank 204 having a first end 208 configured to be connected to a tool (e.g., a drill, an impact driver, a screw driver handle, etc.), and a second or working end 212 configured to engage a workpiece or fastener (e.g., a screw, etc.). The illustrated tool bit 200, however, is relatively shorter than the tool bit 100. Furthermore, the shank 204 includes a tool coupling portion 230 having the first end 208, and a head portion 234 having the working end 212.

The head portion 234 of the tool bit 200 defines a plurality of flutes 216, or recesses, and a plurality of vanes 238. The vanes 238 are formed by side walls 220 and outer walls 242. The flutes 216 are defined by a single, curved surface having a radius of curvature (similar to tool bit 100 including the flues 116 having the radius of curvature R as shown in FIG. 7). An intermediate portion 224 extends between the tool coupling portion 230 and the head portion 234. The flute radius and the intermediate portion 224 may have similar dimensions as the flute radius R and the first intermediate portion 124 described above.

In certain embodiments, one end of the intermediate portion 224 may function as a c-ring notch for connecting the tool bit 200 to the tool. Alternatively, the tool bit 200 may have a separate c-ring notch, although this may reduce the total length of the intermediate portion 224.

Figure 6:
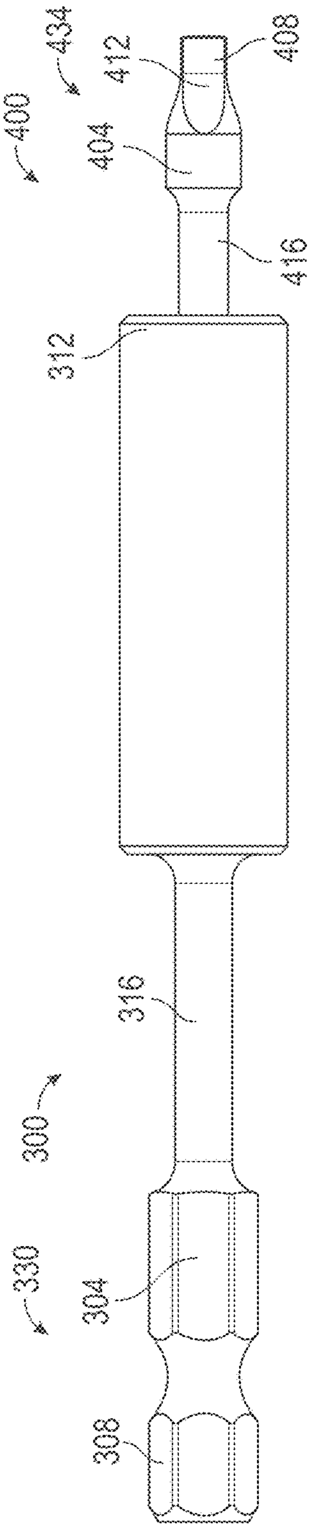
FIG. 6 is a side view of yet another tool bit composed of a PM material.

FIG. 6 illustrates another tool bit 400 having a square head #2 (SQ2) tool bit 408 received in a bit holder 300. The illustrated bit holder 300 includes a shank 304 having a first end 308 configured to be connected to a tool (e.g., a drill, an impact driver, etc.) and a second end 312 configured to receive the tool bit 400. The shank 304 of the bit holder 300 also defines an intermediate portion 316, which may have similar dimensions as the first intermediate portion 124 described above. The shank 304 includes a tool coupling portion 330 having the first end 308.

The tool bit 400 includes a shank 404 having a first end received in the bit holder 300 and a second or working end 412 configured to engage a workpiece or fastener (e.g., a screw, etc.). The shank 404 of the tool bit 400 also defines an intermediate portion 416, which may be similar to the first intermediate portion 124 described above. The shank 404 includes a head portion 434 having the working end 412. As such, the intermediate portion 316 of the bit holder 300, and the intermediate portion 416 of the tool bit 400 extend between the tool coupling portion 330 and the head portion 434.

Production

The disclosed tool bits 100, 200, 400 and bit holder 300 are preferably manufactured by lathe turning and milling, metal injection molding (MIM), or with a bi-material process, although other methods may also be used. For a turning and milling process, the material to form the tool bits 100, 200, 400 and bit holder 300 is preferably provided in hex shaped bar stock.

MIM is typically an expensive process compared to turning and milling. As MIM wastes essentially none of the source material, however, it may be a cost effective option when working with more expensive materials, such as HSS PM (e.g., PM-M4 and the like). In comparison, a typical turning and milling process may involve milling away about 45% of the source material. In some embodiments, the tool bits 100, 200, 400 and bit holder 300 may be formed using MIM to obtain the net shape geometry of the desired bits. The bits may then be subjected to a secondary process to obtain very high density (and, thus, very high performing) parts. In some embodiments, the secondary process can include a liquid phase sintering process. In other embodiments, the secondary process can include a hot isostatic pressing (HIP) process.

In the bi-material concept, two different materials are combined to form the tool bits 100, 200, 400, for example. This allows a vast majority of the tool bits 100, 200, 400 to be made from a lower cost material, while the tips (i.e., the head portion 134, 234, 434) of the bits are made from HSS PM, for example, which may be welded to the lower cost shaft (i.e., tool coupling portion 130, 230, 330) of the bit. In other embodiments, the tips (or head portions 134, 234, 434) of the bits are made from carbide. The lower cost material may include a non-PM steel such as, for example, 6150 steel or D6A steel. With such materials, the majority (or body 130, 230, 330) of the tool bits 100, 200, 400 is still made from a quality material that is capable of handling high temperature heat treating and has sufficient ductility for use in, for example, an impact driver.

In other words, the tip of the bit can be made of a first material having a first hardness, and the shank of the bit can be made of a second material having a second, different hardness. The first and second materials may be chosen such that the first hardness is greater than the second hardness. Accordingly, the hardness of the tip is greater than the hardness of the shank to reduce wear imparted to the tip during use of the bit. The reduced hardness of the shank relative to the tip may also increase the impact-resistance of the bit.

In some embodiments, the two materials used to create the bi-material bits may also initially have different geometries. For example, a round (i.e., circular cross-sectional shape) stock of higher quality high speed steel, such as PM steel, may be welded or otherwise secured to a hex (i.e., hexagonal cross-sectional shape) stock of lower cost material. The round stock, which is more common than the hex stock, can then be machined into the desired shape of the bit tip. With reference to the tool bits 100, 200, 400, the head portion 134, 234, 434 and the plurality of intermediate portions 124, 224, 416 may be formed from the round stock, and the tool coupling portion 130, 230, 330 may be formed from the hex stock. Furthermore, the bit holder 300 may also be formed from the hex stock and the round stock. The bit holder 300 may be also be formed from the same material or different materials.

An insert-molding process, such as a two-shot metal injection molding (MIM) process, may be used to manufacture a bit having a conjoined tip (i.e., the head portion 134, 234, 434 and plurality of intermediate portions 124, 224, 416) and shank (i.e., the tool coupling portion 130, 230, 330) made from two different metals. Particularly, the tip may be made of a metal having a greater hardness than that of the shank and a drive portion. Because the dissimilar metals of the tip and the shank are conjoined or integrally formed during the two-shot MIM process, a secondary manufacturing process for connecting the tip to the remainder of the bit is unnecessary. Alternately, rather than using an insert molding process, the tip may be attached to the shank using a welding process (e.g., a spin-welding process).

A sintering process such as a hot isostatic pressing (HIP) process may be used to manufacture the tool bit 100, 200, 400 and bit holder 300. Specifically, the PM is atomized into micro ingots. In one embodiment, the PM is atomized with Argon gas. The atomized PM micro ingots are injected into a mold. Subsequently, the atomized PM micro ingots are sintered, while in the mold, into a block. Specifically, the high pressure of the HIP process molds or welds individual PM particles together into the block. In some embodiments, the atomized PM micro ingots may be injected into a mold that has a hexagonal cross-sectional shape such that the block has a hexagonal cross-sectional shape after the HIP process. In other embodiments, the atomized PM micro ingots may be injected into a mold that has a near net shape of the desired tool bit. The mold may be machined away such that only the block remains. A milling process may then be used to mill the block to predetermined dimensions of the tool bit 100, 200, 400. In another embodiment, the atomized PM micro ingots are sintered, while in the mold, into the tool bit 100, 200, 400. As such, minimal or no milling may be required to achieve the predetermined shape of the tool bit 100, 200, 400 after sintering the atomized PM micro ingots into the tool bit 100, 200, 400. In the illustrated embodiment, the PM is formed of HSS material.

Rather than using different materials during the manufacturing process to create a tool bit, the tip (i.e., the head portion 134, 234, 434 and plurality of intermediate portions 124, 224, 416) of the tool bit may include a layer of cladding having a hardness greater than the hardness of the shank. Furthermore, the hardness of the cladding may be greater than the hardness of the underlying material from which the tip is initially formed. The cladding may be added to the tip using any number of different processes (e.g., forging, welding, etc.). The addition of the cladding to the tip may increase the wear resistance of the tip in a similar manner as described above.

Without wanting to be limited by theory, heat treatment contributes to the high wear resistance of the bits. Heat treatment is typically completed in a vacuum furnace, although it may also be performed in a salt bath or by another method commonly known in the art.

In certain embodiments, the heat treatment includes preheating, austenitizing, and/or tempering. In some embodiments, the heat treatment can be done with two preheats. The first preheat can be done at, for example, about 1525 degrees Fahrenheit. The second preheat can be done at, for example, about 1857 degrees Fahrenheit. In other embodiments, the heat treatment can be done with a single preheat. In further embodiments, the heat treatment may be done with three or more preheats. In still other embodiments, the heat treatment may be done without preheats or the temperatures of the preheats may be different.

In some embodiments, the tool bits 100, 200, 400 and bit holder 300 may be austenitized at a temperature between about 1975 and about 2025 degrees Fahrenheit. In other embodiments, the austenitizing temperature may be about 2000 degrees Fahrenheit. In such embodiments, the temperature may be held for about 3 minutes. In other embodiments, the temperature may be held for between about 2 and about 4 minutes. In further embodiments, the temperature may be held for at least about 3 minutes.

Tempering may be done in a vacuum two times. In some embodiments, the tool bits 100, 200, 400 and bit holder 300 may be tempered at a temperature between about 1000 and about 1050 degrees Fahrenheit each time. In other embodiments, the tempering temperature may be about 1025 degrees Fahrenheit. In such embodiments, the temperature may be held for about 2 hours each time. In other embodiments, the temperature may be held for between about 1 and about 3 hours each time. In further embodiments, the temperature may be held for at least 2 hours each time. In still other embodiments, the tempering may be done more than two times.

After heat treating, the tool bits 100, 200, 400 and bit holder 300 can have a final hardness greater than or equal to 61 on the Rockwell C scale (HRC). In some embodiments, the hardness can be between about 61 and about 63 HRC. In certain embodiments, the hardness may be about 61, about 61.1, about 61.2, about 61.3, about 61.4, about 61.5, about 61.6, about 61.7, about 61.8, about 61.9, about 62, about 62.1, about 62.2 about 62.3, about 62.4, about 62.5, about 62.6, about 62.7, about 62.8, about 62.9, or about 63 HRC. In further embodiments, the hardness may be greater than 63 HRC.

Coating

In certain embodiments, the tool bits 100, 200, 400 and bit holder 300 are coated to improve corrosion resistance. The bits are preferably nickel plated, although other suitable coatings are well known in the art, such as phosphating or oxidize coatings, for example. M4 steel is a particularly good base for chemical vapor deposition (CVD) or physical vapor deposition (PVD) coatings, but these are comparatively expensive.

Data and Test Results

As shown in the table below, analysis was performed on PM HSS tool bits (i.e., tool bit #1—PM) and wrought HSS tool bits (i.e., tool bit #2—Wrought). In particular, tool bit #1 is composed of powdered metal (PM) material having a grade of M4. Tool bit #2 is composed of wrought material having a grade of M2. The analysis was conducted to determine the size and the shape of the carbide particles of tool bit #1 compared to the size and the shape of the carbide particles of tool bit #2. For each tool bit, three cross sections were taken in which the cross-sectional sample was mounted polished, and etched for two minutes with five percent nital. Ninety carbide particles were analyzed from the three cross-sections at 2000× magnification. Specifically, the size and the shape was determined for all of the analyzed carbide particles. The area of each carbide particle was measured and the circularity of each carbide particle was also determined. Circularity is defined as $$C = \frac{4\pi Area}{\text{Perimeter}^2},$$

where C=1 is perfectly round. The average, standard deviation, minimum, and maximum was determined for the area and the circularity for each tool bit.

| Tool Bit | Size/Shape | Average | Std. Dev. | Minimum | Maximum |
|---|---|---|---|---|---|
| #1-PM | Area (micron$^2$) | 1.585 | 0.644 | 0.55 | 4.697 |
| | Circularity | 0.89 | 0.123 | 0.31 | 0.991 |
| #2-Wrought | Area (micron$^2$) | 10.182 | 24.26 | 0.371 | 148.136 |
| | Circularity | 0.78 | 0.232 | 0.206 | 0.991 |

With continued reference to the table of FIG. 7, the carbide particles of tool bit #2 had an average area of 10.182 micron$^2$ and an average circularity of 0.78. In contrast, the carbide particles of tool bit #1 had an average area of 1.585 micron$^2$ and an average circularity of 0.89. The standard deviation of the carbide particles of tool bit #2 was 24.26, while the standard deviation of the carbide particles of tool bit #1 was 0.644. As such, the carbide particles of tool bit #1 are substantially uniform (i.e., each of the carbide particles are about the same size and the same shape). In comparison to tool bit #1, the carbide particles of tool bit #2 do not have generally the same size or the same shape. Specifically, the area of most of the carbide particles of tool bit #1 is less than 2.55 micron$^2$, in which most of the carbide particles is defined as 85 carbide particles out of the 90 carbide particles analyzed.

Tool bits embodying the invention were tested to determine a hardness and impact durability of the tool bits in comparison to conventional tool bits currently in the market. In one test, Phillips #2 tool bits were used with various screws, materials, and tools to simulate everyday use. The tool bits were used until failure (e.g., the tool bit wore out and was no longer suitable for use). The conventional tool bits ranged, on average, from about 168 to about 1369 uses before wearing out. In contrast, the tool bits embodying the invention made of PM HSS ranged, on average, from about 2973 to about 3277 uses (depending on the size/length of the tool bit) before wearing out.

In another test, T25 tool bits were used with an impact driver to drive screws into double-stack laminated veneer lumber (LVL) with pre-drilled sheet steel over the top. The tool bits were used until failure. The conventional tool bits ranged, on average, from about 557 to about 2071 uses before failure. In contrast, tool bits embodying the invention made of PM HSS all lasted until the test was stopped at 3000 screws driven without any of the tool bits failing, showing improved impact durability over the conventional tool bits.

In another test, PH2 tool bits were used with an impact driver to drive screws into a double-stack LVL. The tool bits were used until failure. The conventional bits ranged, on average from about 178 to about 508 uses before failure. In contrast, tool bits embodying the invention made of PM HSS ranged, on average, from about 846 to about 953 uses (depending on the size/length of the tool bit) before failure, with many tool bits lasting until the test was suspended at 1000 screws driven. This test also showed improved impact durability over conventional tool bits.

Thus, the invention provides, among other things, a tool bit having markedly improved wear resistance. While specific configurations of the tool bit have been described, it is understood that the present invention can be applied to a wide variety of tool components and that the tool bit could take on a variety of other forms, for example, cutting components of other hand or power tools. Various features and advantages of the invention are set forth in the following claims.

What is claimed is:

1. A tool bit for driving a fastener, the tool bit comprising:
a shank including
a tool coupling portion configured to be coupled to a tool,
a head portion configured to engage the fastener, and
an intermediate portion disposed between the tool coupling portion and the head portion, the intermediate portion having an outer diameter that is less than an outer dimension of the tool coupling portion, and
a nickel coating on the head portion of the shank,
wherein the head portion is composed of powdered metal (PM) steel having carbide particles distributed uniformly throughout the head portion, and
wherein the outer diameter of the intermediate portion is selected such that the intermediate portion has a strength about 10% stronger than a shear strength of the head portion.

2. The tool bit of claim 1, wherein the PM steel has a carbide particle concentration of at least 6% by volume.

3. The tool bit of claim 1, wherein each of the carbide particles has a similar shape and a similar size.

4. The tool bit of claim 1, wherein the intermediate portion has a cylindrical shape.

5. The tool bit of claim 1, wherein the head portion, the intermediate portion, and the tool coupling portion are integral.

6. The tool bit of claim 1, wherein intermediate portion is a first intermediate portion, and wherein the shank also includes a second intermediate portion disposed between the tool coupling portion and the first intermediate portion.

7. The tool bit of claim 6, wherein the second intermediate portion has an outer diameter that is greater than the outer diameter of the first intermediate portion and less than the outer dimension of the tool coupling portion.

8. The tool bit of claim 1, wherein the outer diameter of the intermediate portion is between about 2.0 mm and about 5.0 mm.

9. The tool bit of claim 8, wherein the intermediate portion has an effective length between about 10 mm and about 26 mm.

10. A method of manufacturing a tool bit, the method comprising the steps of:
preheating the tool bit at a first temperature;
preheating the tool bit at a second temperature that is greater than the first temperature;
austenitizing the tool bit, after preheating the tool bit, at a third temperature that is greater than the second temperature; and tempering the tool bit, after austenitizing the tool bit, at a fourth temperature that is less than the third temperature.

11. The method of claim 10, wherein the third temperature is between about 1975 degrees Fahrenheit and about 2025 degrees Fahrenheit.

12. The method of claim 10, wherein austenitizing the tool bit includes austenitizing the tool bit for between about 2 minutes and about 4 minutes.

13. The method of claim 10, wherein the fourth temperature is between about 1000 degrees Fahrenheit and about 1050 degrees Fahrenheit.

14. The method of claim 10, wherein tempering the tool bit includes tempering the tool bit for between about 1 hour and about 3 hours.

15. The method of claim 10, wherein tempering the tool bit includes tempering the tool bit in a vacuum two times.

* * * * *